United States Patent [19]
Cesari et al.

[11] Patent Number: 5,912,908
[45] Date of Patent: Jun. 15, 1999

[54] METHOD OF EFFICIENT BRANCH METRIC COMPUTATION FOR A VITERBI CONVOLUTIONAL DECODER

[75] Inventors: Richard Adam Cesari, Dallas, Tex.; Sivanand Simanapalli, Allentown, Pa.

[73] Assignee: Lucent Technologies Inc., Murray Hill, N.J.

[21] Appl. No.: 08/976,358

[22] Filed: Nov. 21, 1997

[51] Int. Cl.$^6$ .................................................. G06F 11/10
[52] U.S. Cl. ..................... 371/43.7; 371/43.1; 371/43.6; 371/43.8; 371/37.4; 371/37.8; 375/341; 375/262; 341/200
[58] Field of Search .................... 371/43.7, 43.1, 371/43.8, 43.6, 37.4, 37.8; 375/341, 262, 229, 340, 269, 286, 347; 341/200

[56] References Cited

U.S. PATENT DOCUMENTS

| | | | |
|---|---|---|---|
| 5,349,608 | 9/1994 | Graham et al. | 375/94 |
| 5,454,014 | 9/1995 | Blaker et al. | 375/341 |
| 5,550,870 | 8/1996 | Blaker et al. | 375/341 |

OTHER PUBLICATIONS

Bree et al., "A Bit–Serial Architecture For A VLSI Viterbi Processor", IEEE, pp. 71–77, 1988.

Provence et al., "Systolitic arrays for Viterbi Processing in Communication Systems wity a Time–Dispersive Channel", IEEE, pp. 1148–1156, Oct. 1988.

Svensson, "Simulated Symbol Error Probability for a Matched Filter Differential Detector with Variable Delay for Continuous Phase Modulation", IEEE, pp. 1336–1339, Dec. 1988.

Stölzle et al., "A VLSI Wordprocessing Subsystem for a Real Time Large Vocabulary Continous Speech Recognition System", IEEE, pp. 20.7.1–20.7.5, 1989.

D'Avella et al., "An Adaptive MLSE Receiver for TDMA Digital Mobile Radio", IEEE, pp. 122–129, Jan. 1989.

Benedetto et al., "Encoded 16–PSK: A Study for the Receiver Design", IEEE, pp. 1381–1391, Dec. 1989.

*Primary Examiner*—Reba I. Elmore
*Assistant Examiner*—McDieunel Marc

[57] ABSTRACT

A method of efficient branch metric computation for a Viterbi convolutional decoder wherein a reduced and optimized set of branch metrics is distributed among one or more base sets is provided. A sequence of data transformations and associations are defined according to the connections of the delay elements in the convolutional encoder to its outputs. Each encoder state is associated with one of the base sets and one of several groups of path metric equations. During the add portion of the add-compare-select phase of Viterbi decoding, a branch metric value is extracted from the base set associated with the encoder state being evaluated. The group of path metric equations associated with state being evaluated are evaluated using the extracted branch metric value. The results of the addition are then be processed according to the remaining steps of the Viterbi algorithm.

12 Claims, 8 Drawing Sheets

IS-95 RATE 1/2, CONSTRAINT LENGTH 9 CONVOLUTIONAL ENCODER

FIG. 2
PRIOR ART

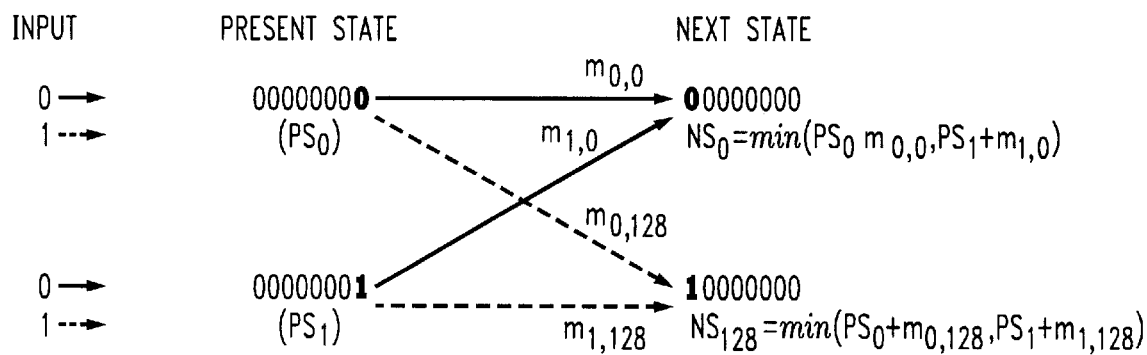

FIG. 3

| STAGE | ENCODER STATES | INPUT | DELAY ELEMENT | g(0) | g(1) | DATA TRANSFORMATIONS |
|---|---|---|---|---|---|---|
| - | 0 | 0 | - | - | - | INITIALIZE ENCODER: STATE 0, INPUT 0, OUTPUT 00 |
| 0 | 1 | 0 | $d^8$ | YES | YES | COMPLIMENT $C_0$ AND $C_1$ OF STATE 1 |
| 1 | 2-3 | 0 | $d^7$ | YES | NO | COMPLIMENT $C_0$ OF STATES 0-1 |
| 2 | 4-7 | 0 | $d^6$ | NO | NO | SAME AS STATES 0-3 |
| 3 | 8-15 | 0 | $d^5$ | YES | NO | COMPLIMENT $C_0$ OF STATES 0-7 |
| 4 | 16-31 | 0 | $d^4$ | NO | YES | COMPLIMENT $C_1$ OF STATES 0-15 |
| 5 | 32-63 | 0 | $d^3$ | YES | YES | COMPLIMENT $C_0$ AND $C_1$ OF STATES 0-31 |
| 6 | 64-127 | 0 | $d^2$ | YES | YES | COMPLIMENT $C_0$ AND $C_1$ OF STATES 0-63 |
| 7 | 128-255 | 0 | $d^1$ | YES | NO | COMPLIMENT $C_0$ OF STATES 0-127 |
| 8 | 0-255 | 1 | $d^0$ | YES | YES | COMPLIMENT $C_0$ AND $C_1$ OF STATES 0-255 WITH 0 INPUT |

FIG. 4

| INPUT | PRESENT ENCODER STATE | $C_0C_1$ | BRANCH METRIC $X_0C_0+X_1C_1$ | DATA TRANSFORMATIONS |
|---|---|---|---|---|
| 0 | 00000000 | 00 | $-X_0-X_1 \equiv M_0$ | (INITIAL STATE) |
| 0 | 00000001 | 11 | $X_0+X_1 = -M_0$ | STATE 1: COMPLEMENT $C_0,C_1$ OF STATE 0 |
| 0 | 00000010 | 10 | $X_0-X_1 \equiv M_1$ | STATES 2-3: COMPLIMENT $C_0$ OF STATES 1-2 |
| 0 | 00000011 | 01 | $-X_0+X_1 = -M_1$ | |
| 0 | 00000100 | 00 | $M_0$ | STATES 4-7: SAME AS STATES 0-3 |
| 0 | 00000101 | 11 | $-M_0$ | |
| 0 | 00000110 | 10 | $M_1$ | |
| 0 | 00000111 | 01 | $-M_1$ | |
| 0 | 00001000 | 10 | $M_1$ | STATES 8-15: COMPLEMENT $C_0$ OF STATES 0-7 |
| 0 | 00001001 | 01 | $-M_1$ | |
| 0 | 00001010 | 00 | $M_0$ | |
| 0 | 00001011 | 11 | $-M_0$ | |
| 0 | 00001100 | 10 | $M_1$ | |
| 0 | 00001101 | 01 | $-M_1$ | |
| 0 | 00001110 | 00 | $M_0$ | |
| 0 | 00001111 | 11 | $-M_0$ | |
| 0 | 00010000-0011111 | - | - | STATES 16-31: COMPLEMENT $C_1$ OF STATES 0-15 |
| 0 | 00100000-0011111 | - | - | STATES 32-63: COMPLEMENT $C_0,C_1$ OF STATES 0-31 |
| 0 | 01000000-0111111 | - | - | STATES 64-127: COMPLEMENT $C_0,C_1$ OF STATES 0-63 |
| 0 | 10000000-1111111 | - | - | STATES 128-255: COMPLEMENT $C_0$ OF STATES 0-127 |
| 1 | 00000000-11111111 | - | - | STATES 0-255: COMPLEMENT $C_0,C_1$ OF STATES 0-255 WITH 0 INPUT |

FIG. 5A

| EVEN METRIC | 00 | 10 | 00 | 10 | 10 | 00 | 10 | 00 | 01 | 11 | 01 | 11 | 11 | 01 | 11 | 01 |
|---|---|---|---|---|---|---|---|---|---|---|---|---|---|---|---|---|
| BASE SET 1 | $M_0$ | $M_1$ | $M_0$ | $M_1$ | $M_1$ | $M_0$ | $M_1$ | $M_0$ | $-M_1$ | $-M_0$ | $-M_1$ | $-M_0$ | $-M_0$ | $-M_1$ | $-M_0$ | $-M_1$ |

FIG. 5B

| EVEN METRIC | 10 | 00 | 10 | 00 | 00 | 10 | 00 | 10 | 11 | 01 | 11 | 01 | 01 | 11 | 01 | 11 |
|---|---|---|---|---|---|---|---|---|---|---|---|---|---|---|---|---|
| BASE SET 2 | $M_1$ | $M_0$ | $M_1$ | $M_0$ | $M_0$ | $M_1$ | $M_0$ | $M_1$ | $-M_0$ | $-M_1$ | $-M_0$ | $-M_1$ | $-M_1$ | $-M_0$ | $-M_1$ | $-M_0$ |

FIG. 5C

| 2L METRIC SEGMENT | CORRESPONDING METRICS | CORRESPONDING ACS STATES | ACS ASSOCIATIONS SET | ACS ASSOCIATIONS POLARITY |
|---|---|---|---|---|
| 1 | 0-31 | 0-15 | 1 | POSITIVE |
| 2 | 32-63 | 16-31 | 1 | NEGATIVE |
| 3 | 64-95 | 32-47 | 1 | NEGATIVE |
| 4 | 96-127 | 48-63 | 1 | POSITIVE |
| 5 | 128-159 | 64-79 | 2 | POSITIVE |
| 6 | 160-191 | 80-95 | 2 | NEGATIVE |
| 7 | 192-223 | 96-111 | 2 | NEGATIVE |
| 8 | 224-255 | 112-127 | 2 | POSITIVE |
| 9 | 256-287 | 128-143 | 1 | NEGATIVE |
| 10 | 288-319 | 144-159 | 1 | POSITIVE |
| 11 | 320-351 | 160-175 | 1 | POSITIVE |
| 12 | 352-383 | 176-191 | 1 | NEGATIVE |
| 13 | 384-415 | 192-207 | 2 | NEGATIVE |
| 14 | 416-447 | 208-223 | 2 | POSITIVE |
| 15 | 448-479 | 224-239 | 2 | POSITIVE |
| 16 | 480-511 | 240-255 | 2 | NEGATIVE |

FIG. 7

Compute kernel metric values M0, M1 according to received data symbol
/* Store metric values in base sets in predefined sequence */
set1 = M0, M1, M0, M1, M1, M0, M1, M0, -M1, -M0, -M1, -M0, -M0, -M1, -M0, -M1
set2 = M1, M0, M1, M0, M0, M1, M0, M1, -M0, -M1, -M0, -M1, -M1, -M0, -M1, -M0
/* Perform ACS */
/* ACS for states 0 to 15 */
pointer = 0
do 16 {
    m = set1 (pointer++)                   /* Extract metric from set 1*/
    a0 = PS0 + m; a1 = PS0 - m         /* Positive polarity add */
    compare (a0,a1)
    determine and store traceback bit
}
/* ACS for states 16 to 31 */
pointer = 0
do 16 {
    m = set1 (pointer++)                   /* Extract metric from set 1*/
    a0 = PS0 - m; a1 = PS0 + m         /* Negative polarity add */
    compare (a0,a1)
    determine and store traceback bit
}
/* ACS for states 32 to 47 */
pointer = 0
do 16 {
    m = set1 (pointer++)                   /* Extract metric from set 1*/
    a0 = PS0 - m; a1 = PS0 + m         /* Negative polarity add */
    compare (a0,a1)
    determine and store traceback bit
}
/* ACS for states 48 to 63 */
pointer = 0
do 16 {
    m = set1 (pointer++)                   /* Extract metric from set 1*/
    a0 = PS0 + m; a1 = PS0 - m         /* Positive polarity add */
    compare (a0,a1)
    determine and store traceback bit
}
/* ACS for states 64 to 79 */
pointer = 0
do 16 {
    m = set2 (pointer++)                   /* Extract metric from set 2*/
    a0 = PS0 + m; a1 = PS0 - m         /* Positive polarity add */
    compare (a0,a1)
    determine and store traceback bit
}
        ⋮
/* ACS for states 240 to 255 */
pointer = 0
do 16 {
    m = set2 (pointer++)                   /* Extract metric from set 2*/
    a0 = PS0 - m; a1 = PS0 + m         /* Negative polarity add */
    compare (a0,a1)
    determine and store traceback bit
}
Perform Traceback Operation

METHOD OF EFFICIENT BRANCH METRIC COMPUTATION FOR A VITERBI CONVOLUTIONAL DECODER

TECHNICAL FIELD

This invention is related to the branch metric computation in the Viterbi algorithm on a general purpose digital signal processor.

BACKGROUND OF THE INVENTION

In wireless and wireline applications, particularly those with significant intersymbol interference, error detection and correction is performed using convolutional encoding and Viterbi Decoding. Convolutional encoding is performed by convolving a data input bit to hardware or software encoder with one or more previous input bits. An example of a conventional IS-95 rate 1/2, constraint length 9 convolutional encoder 10 is shown in FIG. 1a. The information bits are input to a series of delay elements 12 such as a shift register that is tapped at various points. The tapped values are combined by an XOR function 14 to generate encoded data symbols. In the example encoder 10, two output bits, $c_0$ and $c_1$, are generated for every input bit. Thus, this encoder has a rate of 1/2. The constraint length represents the total span of values used by the encoder and is represented by the symbol K. A constraint length K=9 means that there are $2^{(9-1)}=256$ encoder states (since the ninth bit is the input bit). These states are designated represented as state $S_0$ (decimal 0, binary 00000000) to state $S_{255}$ (decimal 255, binary 11111111).

FIG. 1b illustrates a typical application environment using convolutional encoding and Viterbi decoding. Source data 5 is input to convolutional encoder 10. Encoded data is output as a sequence of data symbols 20 which are formatted appropriately and transmitted over a communications link 22. The communications link 22 introduces noise into the data signal and therefore the transmitted data symbols may be corrupted by the time they reach their destination. Each received (and possibly corrupted) data symbol 24 is processed by a convolutional decoder 26 to generate decoded data 28 which corresponds to the most likely sequence of source data 5.

The received data signals 24 are processed according to the Viterbi algorithm. The basis of the Viterbi algorithm is to decode the convolutionally encoded data symbols by using knowledge of the possible encoder state transitions from one given state to the next based on the dependance of a given data state on past data. The allowable state transitions are typically represented by a trellis diagram. The Viterbi algorithm provides a method for minimizing the number of state paths through the trellis by limiting the paths to those with the highest probability of matching the transmitted data sequence based on the received sequence.

FIG. 2 is an illustration of the basic Viterbi algorithm butterfly computation. Four possible encoder transitions from a present state (PS) to a next state (NS) are illustrated, where the present state is equivalent to the numeric value of the data stored in the K-1 delay elements 12 of the encoder 10. When a bit is input to the encoder, the binary value is shifted to the right and the input bit is moved into the most significant bit position (shown in bold in the next state). As illustrated, $NS_0$ can be reached with a 0 input bit from either $PS_0$ or $PS_1$. Similarly, $NS_{128}$ can be reached with a 1 input bit from either $PS_0$ or $PS_1$. The Viterbi algorithm provides a process by which the most likely of the two possible transition paths can be determined and subsequently selected as the "survivor" path. Once a sequence of survivor paths has been determined, the most probable data input sequence can be reconstructed, thus decoding the convolutionally encoded data.

This determination consists of three basic steps. In the first step, the received data symbol, typically an 8 or 16 bit digital value representing the magnitude of voltage or current of an input signal, is processed to determine the Euclidean distance between the received data symbol and all possible actual data symbols, uncorrupted by noise, which could result from a state transition from the present to a next state. This is known as a branch metric computation, the results of which are stored in memory for use during the next step. The branch metric computation provides a measurement of the likelihood that a given path from a present state to a next state is correct. The branch metric m for a transition from present state i to next state j at instant k may be represented as:

$$m_{ij}(k) = \sum_{n=0}^{R-1} |x_n(k) - c_{n,ij}|^2 \qquad \text{(Equ. 1)}$$

where $x_n(k)$ is the received nth data symbol, $C_{n,ij}$ is the actual data symbol which would result from state transition of i to j in the absence of any transmission noise and is determined from the structure of the convolutional encoder, and the rate is 1/R. For a rate 1/R encoder, there are two possible encoder state transitions and therefore two branch metrics must be computed for each next state. Only the relative magnitudes of various branch metrics are important in Viterbi decoding. Since the same input data symbol is processed in each branch metric, the term $\Sigma x_n^2$ is the same for all states i and j and can therefore be removed. Further, $\Sigma c_{n,ij}^2$ is constant if a polar representation is used (i.e., a value of $c_{n,ij}$=0 or 1 corresponds to -1 or +1 respectively). Removing these terms (and the leading -2 scaler value) results in a reduced Euclidean branch metric of:

$$m_{ij} = \sum_{n=0}^{R-1} x_n c_{n,ij} \qquad \text{(Equ. 2)}$$

Thus, decoding data signals from a convolutional decoder of rate 1/R with a constraint length of K requires determining a total of $2^K$ metrics values for each data input symbol. As used herein, the set of $2^K$ metrics values is defined as the complete branch metric set for a particular data input symbol.

One important property of a class of convolutional encoders commonly used is that the second half of the branch metric values are negatives of the first half. Thus, in FIG. 2, $m_{0,128}=-m_{0,0}$ and $m_{1,128}=-m_{0,128}$. Therefore, only half of the branch metric set for a given data input symbol must be explicitly calculated by the decoder during Viterbi decoding.

In the second step, the previously stored branch metric values for all possible state transitions are processed to determine an "accumulated distance" for each input path. The path with the minimum distance (i.e., maximum probability) is then selected as the survivor path. This step is known as Add-Compare-Select, or ACS. The ACS operation can be broken into two operations: (1) the Add operation, or path metric computation, and (2) the Compare-Select operation. The path metric Add operation is the accumulation of the present state cost (a value initialized by the user at the start of the Viterbi processing) with the branch metric values for a received data input symbol. As shown in FIG. 2, the two path metric operations for next state 00000000 are:

$$PS_0 + m_{0,0} \text{ and } PS_1 + m_{1,0} \tag{Equ. 3}$$

The path metric operations for next state 10000000, since the second half metrics are the inverse of the first half, can be written as:

$$PS_0 - m_{0,0} \text{ and } PS_1 - m_{1,0} \tag{Equ. 4}$$

The decoder computes and compares two values from the Add operation to determine the minimum (or maximum, depending on implementation) and stores one or more "traceback bits" to indicate the selected survivor path.

The third step is known as traceback. This step traces the maximum likelihood path through the trellis of state transitions, as determined by the first two steps, and reconstructs the most likely path through the trellis to extract the original data input to the encoder. In this example, the survivor path is represented by the least significant bit of the present state, i.e., the traceback bit (shown in bold in FIG. 2). For example, if the path from present state $S_1$ is chosen over the path from present state $S_0$, the traceback bit is 1. Various methods of processing traceback data to determine the original data input to the encoder are well known to those skilled in the art.

Because Viterbi decoding is so prevalent in digital signal processing applications, it is important that the convolutional decoder be able to process the Viterbi algorithm quickly and efficiently. Conventional implementations comprise a programmable digital signal processor and a decoder algorithm that computes all $2^K$ metrics for a given data input symbol 24 at the start of a decoding process and stores the entire branch metric set in memory. However, this brute force technique requires a minimum of $2^K$ calculations and thus can consume a comparatively large number of machine cycles. Further, storing the entire table can consume a relatively large amount of memory. Although conventional techniques achieve some reduction by storing only the first half of the branch metric values, since the second half is simply the inverse of the first half, there is still a great deal of redundancy in the metric data, resulting in a waste of storage area.

According to the present invention, efficient branch metric computation for a Viterbi convolutional decoder is provided by processing a received data symbol to generate a reduced set of branch metrics for an encoder of constraint length K, instead of the entire set of $2^K$ metrics, and storing the reduced set in memory for use in the Viterbi processing. The reduced metric set comprises a kernel of the unique metric values for a present data input symbol which exist in the complete metric set and may also include a small subset of precalculated metric values from the complete set. A sequence of K basic data transformations is defined according to the physical structure of the convolutional encoder and used to eliminate redundances in the complete metric set. By applying these transformations to the kernel metric values, all $2^K$ metrics can be extrapolated.

The reduced metric sequence for a data input symbol is stored in memory as one or more reduced base sets of metric values and a sequence of base set and polarity associations used during the add-compare-select (ACS) step of Viterbi processing. During the ACS operation, the branch metric value required for each state calculation is retrieved from the associated base set and a particular set of path metric operation is chosen or the sign of the retrieved branch metric value is calibrated according to the to the associated polarity. This method of reducing the number of branch metrics which must be calculated and stored for each data input symbol results in a substantial savings in the number of cycles required to calculate the complete branch metric set as well as in the amount of storage required to store the predefined branch metric values.

BRIEF DESCRIPTION OF THE DRAWINGS

The foregoing and other features of the present invention will be more readily apparent from the following detailed description and drawings of illustrative embodiments of the invention in which:

FIG. 2 is a conventional illustration of the basic Viterbi butterfly computation;

FIG. 3 is a table of data transformations derived for the convolutional encoder of FIG. 1a;

FIG. 4 is a table showing the branch metric values generated by using the data transformations of FIG. 3;

FIGS. 5a,b,c are tables showing the base sets and ACS associations used during Viterbi add-compare-select according to the present invention for the encoder of FIG. 1;

FIG. 7 is pseudo-code listing of a preferred implementation of the Viterbi algorithm using the method of efficient branch metric computation according to the present invention.

DETAILED DESCRIPTION OF THE PREFERRED EMBODIMENT(S)

Figure 1A:
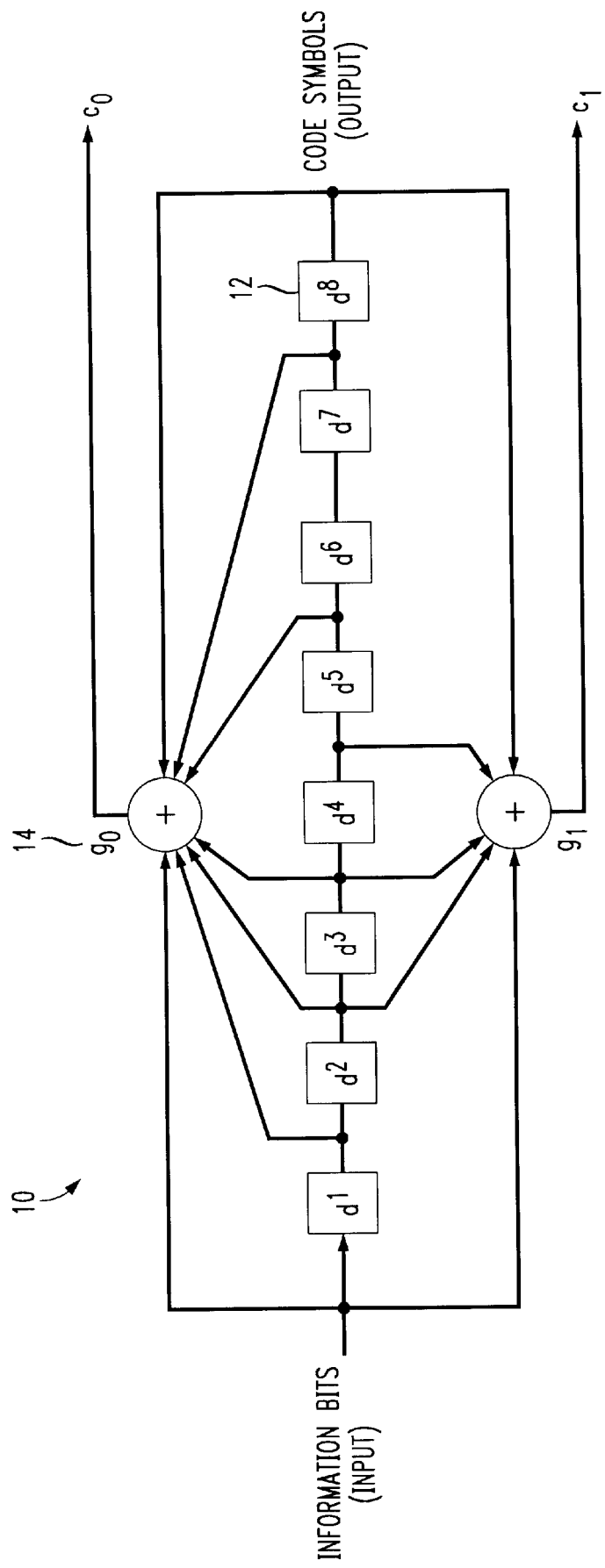
FIG. 1a is an illustration of a conventional IS-95 rate 1/2, constraint length 9 convolutional encoder.

According to the present invention, efficient branch metric computation for a Viterbi convolutional decoder 26 is achieved by first deriving a set of data transformations based on the physical structure of the convolutional encoder 10. These transformations are used to reduce the complete set of branch metric values needed to process a given data input symbol to a small number of base sets housing a subset of the complete branch metric set and a sequence of ACS associations which control how branch metric data stored in the base sets is used during the add-compare-select sequence of the Viterbi algorithm.

The first step in reducing the branch metric set according to the present invention is to generate the K data transformations for the convolutional encoder 10 having constraint length K. The transformations (and associations, discussed below) are derived according to the presence of delay operators in the convolutional encoder that act on the digit positions of a data signal prior to encoding and the effect of these delay operators on the convolutionally encoded data output from the encoder.

The physical or logical delay and output structure of a convolutional encoder 10 may be described by one or more polynomials. For the encoder of FIG. 1a, the representative polynomials are:

$$g_0 = 1 + d + d^2 + d^3 + d^5 + d^7 + d^8 \tag{Equ. 5}$$

$$g_1 = 1 + d^2 + d^3 + d^4 + d^8 \tag{Equ. 6}$$

where each delay operator d acts on a historic digit of the data to be encoded and may be implemented by a shift operation or through software. The input bit and the last delay state of a conventional 1/R encoder of constraint length K is always connected to the output XOR function. Thus, the representative polynomials are always of form $g = 1 + \ldots + d^{K-1}$, where $d^{K-1}$ is the output of the last delay state in the shift register.

Input data shifted through an encoder 10 affects the encoded output bits depending on both on the value of the input data digit in the delay element 12 (i.e., a "0" or a "1" for binary data) and which delay elements 12 are actually tapped to generate the output 14. In the (artificial) situation when the output 20 of the encoder 10 is evaluated for each encoder state in turn with both a 0 and a 1 input bit, delay elements 12 do not effect the output until a "1" data value is stored in them. So, for example, the last delay element 12 in FIG. 1a, element $d^8$, has an effect beginning with encoder state 1 since 0 is high. The effect of delay element $d^7$ begins with encoder state 2, when bit 1 is high, and is the highest order delay state that has an effect until encoder state 4, when the effect of delay element $d^6$ is introduced since bit 2 is high. Delay element $d^6$ is the highest order delay state for states 4–7, and so on.

The set of sequential encoder states during which a given bit of the encoder state is the highest order state with an effect on the output is defined herein an encoder "stage." Thus, stage 2 corresponds to encoder states 4–7 since bit 2 is the highest order bit for these encoder states. Since the sequence of lower order bits in the binary representation of the encoder state repeats as each higher order bit is set in turn, the pattern of output bits for each stage can determined by transforming the pattern of previous output bits in accordance with how the delay element at the given stage affects the encoded data output.

When the encoder is initialized to state 0 with a 0 input, it will always have an initial output of 0 for all output functions. The pattern of the output bits at each stage k, k=K−1 to 0 for each polynomial at the $2^{K-1-k}$ subsequent sequential states within that stage is:

(a) the output bit sequence is the same as that for the previous $2^{K-1-k}$ sequential states if there is no connection to the function's XOR gate at that stage (i.e., the $d^k$ delay term is absent from the representative polynomial); and (b) the output bit sequence is the complement of that for the previous $2^{K-1-k}$ sequential states if there is a connection to the function's XOR gate at that stage (i.e., the $d^k$th term is present in the polynomial).

This pattern is used to produce a concise sequence of data transformations which can be applied to a reduced subset of metrics for a given received data symbol 24 to thereby generate the complete $2^K$ branch metric set required to process the data symbol 24.

To discuss producing the data transformations, it is useful to expand Equ. 2 (above) for an encoder of rate 1/2. The result is the basic branch metric equation which is used during the processing of data symbols 24 in a Viterbi decoder 26:

$$m = x_0 c_0 + x_1 c_1 \quad \text{(Equ. 7)}$$

In polar form, the values of $c_0$ and $c_1$ are either −1 (corresponding to a "0" value) or +1 (corresponding to a "1" value). Therefore, there are only four possible branch metric values, two of which are compliments of the other two. Thus, only two unique metric values, here identified as $M_0$ and $M_1$, must be determined for an input symbol. For convenience, $M_0$ is defined as equal to $-x_0-x_1$, and $M_1$ is defined as equal to $x_0-x_1$. As can be appreciated, these definitions are somewhat arbitrary and other definitions are also possible. For example, $M_1$ could also be defined as being equal to $-x_0+x_1$. The unique metric values (here $M_0$ and $M_1$) comprise the kernel of the complete set of branch metric values.

This analysis will now be applied to the encoder of in FIG. 1a with a branch metric of Equ. 7. An input bit of 0 in state 0 (i.e., all stages 12 of the shift register are "0"), results in output of 00, and therefore (using polar representation) the branch metric value is $M_0$. (This definition is valid for all encoders of this class since, in this state, the initial output bits for a zero input will always be 00). For stage zero, i.e., encoder state $2^0=1$, the output bits are 11, the complements of both bits in the previous $2^0=1$ state because there is a connection to the XOR gates for $g_0$ and $g_1$ at the least significant bit. In other words, the polynomials of Equs. 5, 6 for $g_0$ and $g_1$ both contain the $d^8$ term, corresponding to bit 0 of the encoder state. This is true for every encoder of this class because the $d^{K-1}$ term is always present. Because this value is a compliment of the previous value, the branch metric is $-M_0$.

Figure 1B:
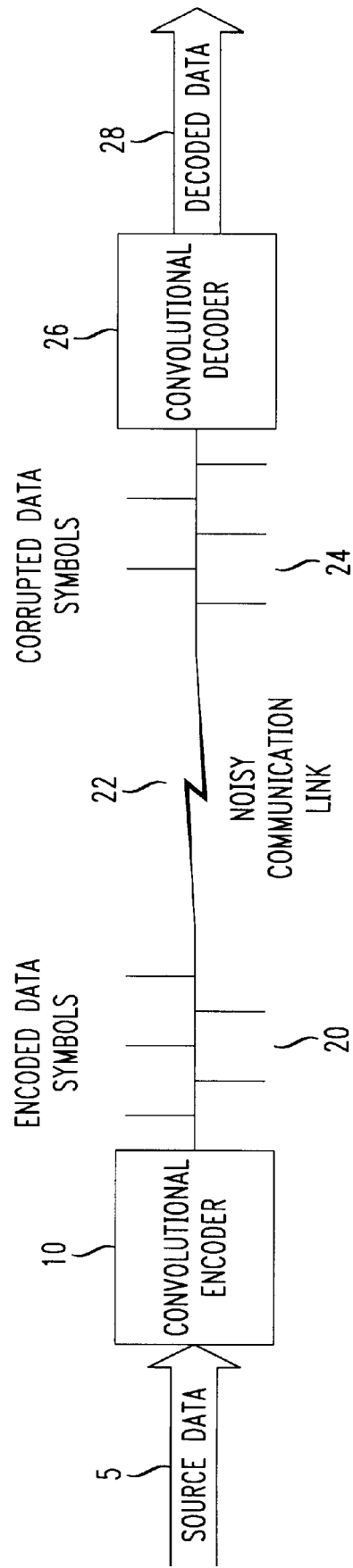
FIG. 1b is an illustration of a typical application environment using convolutional encoding and Viterbi decoding.

The output bits for stage 1, covering the next $2^1$ states (i.e., states 2–3), can be similarly generated by examining connections to the seventh delay element (i.e. the $d^7$ polynomial terms). This term only exists in the equation for $g_0$ and therefore the 7th delay state only affects the $c_0$ output bit. Thus, the data transformations for stage 1 is that outputs for states 2 and 3 are equal to the outputs for states 0 and 1, with the first bit complemented. Transformations for the remaining states are similarly generated. The K data transformations for the convolutional encoder of FIG. 1 are summarized in the table of FIG. 3. The application of these transformations to the first 16 outputs of the encoder of FIG. 1a and the corresponding branch metric values is summarized in the table of FIG. 4.

Once a set of data transformations for a given convolutional encoder are derived, they can be used to generate a substantially reduced data set of branch metric values comprising one or more base sets of metric values derived from the input data symbol and a sequence of ACS associations. Every branch metric value for each of the $2^{K-1}$ states needed during the add-compare-select operation of the Viterbi algorithm can be retrieved from the base sets with a minimum computational cost. Although only one base set is required, for a rate 1/2 encoder, two base sets are preferably used.

According to the method of the present invention, the desired length L of the reduced one or more branch metric base sets must be chosen. The set size L should be a power of 2 in length, with a minimum length of 1 (if two or more sets are used), a minimum length of 2 if only one set is utilized, and a maximum length equal to the number of elements in the branch metric set, $2^K$. Each base set is preferably the same length. The smaller the set size, the fewer branch metric values which must be stored in memory but the greater the number of ACS associations which are necessary. However, as discussed below, an increase in the number of ACS associations will increase program complexity, but will not increase the execution time of the Viterbi ACS operation. Preferably, the set length L is equivalent to the length of the register used to store the traceback bits generated during ACS to simplify programming. In the preferred embodiment, the traceback register is 16 bits in length and the reduced set size L is therefore 16. Since two base sets are used in the preferred embodiment, only 32 metric values must be generated for an input symbol out of the complete set.

Once the length L of the base data sets is chosen, the sequence and sign of kernel metric values that will be stored within the base data sets is generated. When the method according to the present invention is executed, the base sets will be populated with actual branch metric values generated by processing an input data symbol 24. This is discussed below.

The first base data set is populated with a sequence of ordered branch metric values which here correspond to a set of 2L state metrics. In the preferred embodiment, the first L even state metrics are chosen. One method of generating this sequence is by applying the first $\log_2(L)-1$ data transformations derived for the convolutional encoder 10. For a base set size L=16, the first 32 metrics can be computed by applying the first 5 transformations (since $2^5=32$), starting at the initial state of all zeros. For the transformations shown in FIG. 3 and 4, the sequence of branch metric values for base set 1 is:

$M_0, M_1, M_0, M_1, M_1, M_0, M_1, M_0, -M_1, -M_0, -M_1, -M_0, -M_0, -M_1, -M_0, -M_1$

Because the odd state metrics are always the inverse of the immediately preceding even state metric for this class of encoders, for example, as shown in FIG. 4, $m_{1,0}=-m_{0,0}$, the sequence of metrics in base set 1 completely describes the sequence of the first 2L branch metric values. Other sets of ordered state metrics, e.g., the last L odd metrics could also be chosen.

When two base sets are used, the contents of the second data set, i.e., base set 2, is derived from the first data set by replacing $+M_0$ set entries with $+M_1$ and $-M_0$ set entries with $-M_1$. Base set 2 of the preferred embodiment will therefore contain the metric values in the sequence:

$M_1, M_0, M_1, M_0, M_0, M_1, M_0, M_1, -M_0, -M_1, -M_0, -M_1, -M_1, -M_0, -M_1, -M_0$

Base set 2 is derived in this manner because there are only four possible transformations for the two output bits $C_0, C_1$, of 1/2 encoder: compliment $C_0$, compliment $C_1$, compliment both $C_0$ and $C_1$, or do nothing. These transformations correspond to the physical connections in the encoder which define $g_0$ and $g_1$. As shown in FIG. 4, if both $C_0$ and $C_1$ are complimented, the resulting metric value is simply the inverse of the original. For example, $C_0C_1=00$ is metric $M_0$. Inverting both bits results in $C_0C_1=11$, equal to metric $-M_0$. Thus, applying this transformation will not alter the specific $M_0, M_1$ sequence, but only switch the signs of the metric values. If the data transformation only compliments the first bit, however, $+M_0$ entries are replaced with $+M_1$ and $-M_0$ entries become $-M_1$. If only the second bit is complimented, the $+M_0$ entries become $-M_1$ and $-M_0$ entries become $+M_1$. Thus, the data sequence of base set 1 and base set 2 combined provide the proper pattern of $M0_0, M_1$ metric entries for every sequence of 2L metrics in the entire set, but differing sometimes only in the sign of the metric values.

As defined herein, base set 2 is the branch metric compliment of base set 1. A similar branch metric compliment relationship can be derived for encoders with rates other than 1/2 as will be apparent to those skilled in the art. The sequence of values for $C_0$ and $C_1$ and the corresponding metrics for base sets 1 and 2 are summarized in FIGS. 5a and 5b, respectively. According to the preferred embodiment, two branch metric compliment base sets are utilized to limit the number of pointer registers which must be used during the decoding process, discussed below. However, as will be apparent to those skilled in the art, the method according to the invention may also be practiced with only a single base set, with a small increase in program complexity and/or hardware requirements.

According to the invention, once the base sets have been populated with the actual branch metric values in the prescribed sequence, the proper metric value for any state can be determined by selecting the appropriate entry in the one or more base sets and then adjusting the sign of the metric value appropriately. The proper set to use and sign to apply for a particular encoder state are determined by the ACS associations for that state, the generation of which will now be discussed.

During ACS processing, the operations $PS_0+m_{0,0}$ and $PS_1+m_{1,0}$ must be evaluated by the decoder 26. Because the odd state metrics are the inverse of the immediately preceding even state metric, for example, as shown in FIG. 4, $m_{1,0}=-m_{0,0}$, the two ACS addition operations can be reduced to:

$$PS_0+m \text{ and } PS_1m \qquad \text{(Equ. 8)}$$

where m is the appropriate value of the branch metric to use. The ACS associations link a given state to the base set from which the metric value m is taken and the polarity of the addition (e.g., whether the sign of the retrieved m should remain the same or be inverted).

The two operations of Equ. 8 are defined herein as a positive polarity ACS addition group. A negative polarity group is one in which the sign of the retrieved metric m should be reversed. This is preferably accomplished not by changing the sign of m, but instead by reversing the ACS additions in the positive polarity group to form a negative polarity ACS addition group containing the operations:

$$PS_0-m \text{ and } PS_1+m \qquad \text{(Equ. 9)}$$

Those skilled in the art will recognize that more than two ACS addition groups may be required for encoder rates other than 1/R and that alternatively, only one ACS addition group be used and the sign of the retrieved metric m altered instead. The use of "positive" and "negative" to distinguish between the different ACS addition groups is for convenience only and is not intended to limit the number of possible groups used with encoders of different rates.

The ACS associations are derived by dividing the complete branch metric set into segments of length 2L. An initial association is then defined and the last $K-\log_2(L)-1$ transformations, i.e., those which were not used to derive the base sets, are evaluated in turn to recursively determine how the first 2L metrics (e.g., those represented by base set 1) are modified when the data transformations are applied. This process will associate each of the $2^K/2L$ segments with a base set and a polarity.

The first ACS association for a 1/2 rate encoder with two base sets deemed covers segment 1 (i.e., the first 2L, metrics). By default, this segment is associated with base set 1 with a positive polarity because the initial 2L metrics are directly encoded in base set 1 and have the proper signs. This association is referred to as "Set 1/Positive." Each remaining ACS association is recursively derived from prior associations according to how $C_0$ and $C_1$ are modified by the data transformations that apply to the segment at issue.

The second ACS association, covering segment 2, is derived from the data transformation used to generate the second 2L metric values. If both $C_0$ and $C_1$ are complimented, the base set association remains the same but the polarity of the ACS addition group to evaluate is switched for the reasons discussed above with respect to the derivation of the base set sequence. If only $C_0$ is complimented, the associated base set is switched, but the polarity remains the same. If only $C_1$ is complimented, both the base set association and the polarity are switched. Finally, if there is no transformation, such as for states 4–7 in FIGS. 3 and 4, the ACS association for the segment does not change. Because of the recursive and exponential nature of the data transformations, each transformation must be applied to all of the preceding ACS associations to generate the next set of associations. Thus, the number of ACS associations doubles at each step.

The ACS associations for the preferred embodiment of two base sets of size L=16 for the encoder of FIG. 1 will now be derived. The associations are summarized in FIG. 5c. As discussed above, base set 1 covers metrics 0–31 and the first ACS (default) association for segment 1 is "Set 1/Positive". The data transformation for the next 2L metrics, numbers 32–63, compliments both output bits. Thus, the ACS association for segment 2 is "Set 1/Negative". The third data transformation also compliments both bits, but, since it applies to the next two segments of 2L metrics each, numbers 64–127, it is recursively applied to the ACS associations for the first and second segments to generate the ACS associations fo the third and fourth segments. Applying this transformation to the first ACS association gives "Set 1/Negative" as the third ACS association. Applying this transformation to the second ACS association gives "Set 1/Positive" as the fourth ACS association. The data transformation for metrics 128–255 compliments $C_0$. Thus, the next set of ACS associations be the first ones with switched base sets but the same polarity. Finally, the last transformation (for metrics 0–255 with a 1 input) compliments both $C_0$ and $C_1$. Thus, the last eight ACS associations will be the first eight with inverted polarity.

According to the invention, the base set sequences shown in FIGS. 5a and 5b and the ACS associations of FIG. 5c can be used to derive the proper branch metric value for any encoder state. To extract the metric value m for a given encoder state, the segment encompassing the state and the position of the state within the segment is determined. One method of doing this is with a modulus L function. Alternatively, the values may be directly coded or retrieved from look-up table. The segment the state is in determines the base set and polarity associations, defined by the ACS associations. The position within the segment determines which of the L values in the associated base set to extract.

For example, state 8 is in segment 1 which is associated with base set 1. Thus, the ninth entry in base set 1, $-M_1$, is the metric value for state 8. (The base sets are numbered starting at 0). Since the polarity for this state is positive, the sign of retrieved metric value is correct. State 88 is in segment 6. The ACS association for this segment is "Set 2/negative." Thus, the ninth entry from base set 2 is used. The value is $-M_0$. However, since the associated polarity is negative, the sign of the retrieved value must be switched. Preferably, this is accomplished by using the negative ACS addition group. As an alternative to providing a set of ACS addition groups of different polarity and selecting a particular ACS additions group according to the polarity association, the sign of the retrieved branch metric value may instead be calibrated by explicitly altering its sign when the associated polarity is negative. In this alternative implementation, only one set of path metric operations is required, e.g., Equ. 8.

Figure 6A:
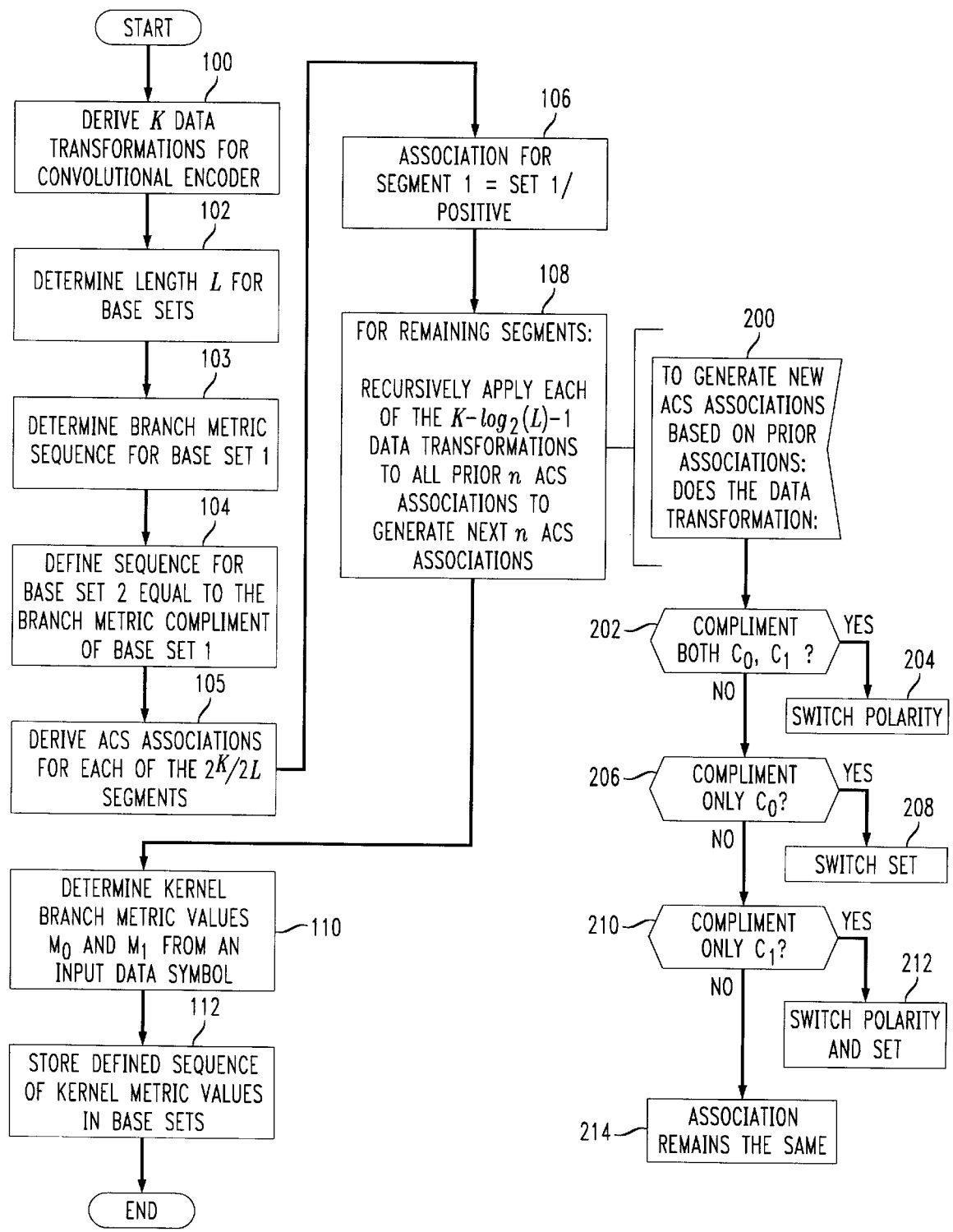
FIG. 6a is a flowchart of the method of generating the base set sequence and ACS associations according to the present invention.
Figure 6B:
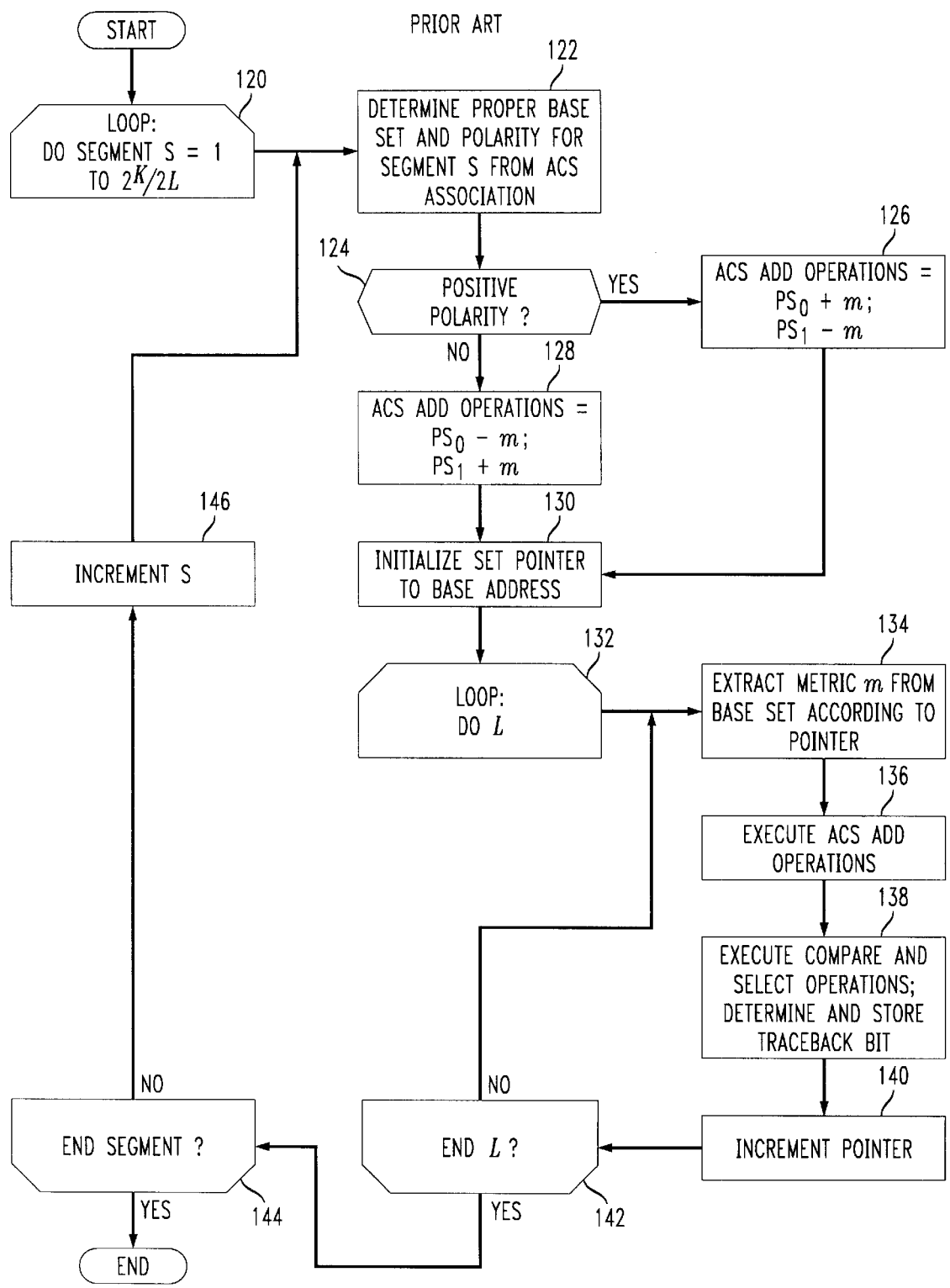
FIG. 6b is a flowchart of the method of applying the base sets and ACS associations of FIGS. 5a,b,c to extract branch metric values during Viterbi ACS according to the invention.

The method of branch metric reduction and Viterbi processing according to the invention is summarized in the flow charts of FIGS. 6a and 6b. The first step according to the present invention is to generate the K data transformations for the convolutional encoder of constraint length K according to the connections between the outputs and the delay elements. (FIG. 6a, Step 100). After the data transformations for a given convolutional encoder 10 are derived, they are used to generate the reduced data set pattern for branch metric values to store in one or more base sets of computed metric values and the ACS associations. The desired length L of the one or more branch metric base sets is chosen (Step 102) and the sequence of data that will be stored within the first base sets is generated. (Step 103). If more than one base set is used, the sequence of data for the remaining base sets is also generated. When two base sets are used, the second base set has a sequence which is the branch metric compliment of the first base set. (Step 104). Once the sequence of base set data has been established, the ACS associations between encoder states and the base sets and metric polarity are established. (Step 105).

By default, the initial association is "Set 1/positive". (Step 106). The remaining association are defined by applying the data transformations to the previously defined associations to generate the next set of associations. The method of applying the transformations to determine the proper associations as discussed above is summarized in steps 200–214.

According to the invention, the Viterbi branch metric computation comprises determining the kernel metric values $M_0$ and $M_1$ related to a given data input symbol (Step 110). These values are then used to generate a sequence of data according to the previously defined branch metric sequences which is stored in memory to form the base sets. (Step 112).

Once the branch metric computation of the Viterbi algorithm is completed, the ACS sequence for the input data symbol must be performed. According to the present invention, all $2^K$ metric values which must be processed by the decoder 26 during the Viterbi ACS sequence for states 0 to $2^{K-1}$ are determined by using only the metrics values stored in base sets and the ACS associations. FIG. 6b illustrates a sequence of extracting the proper branch metric value from the base sets during the ACS portion of the Viterbi algorithm. This sequence is discussed herein as two nested loops. However, this representation is for convenience and other implementations that do not use nested loops are also possible as discussed below.

The outer loop (from step 120 to step 144) steps through each of the segments S in turn. For each segment, the proper base set and polarity are determined from the corresponding ACS association. (Step 122). The polarity is examined (step 124) and the result used to select the proper ACS addition group to evaluate, i.e., positive polarity (step 126) or negative polarity (step 128) (Equations 8 and 9 respectively).

The inner loop (from step 132 to step 142) performs the ACS operation of the Viterbi algorithm for each of the L ACS states corresponding to the 2L metrics in the current segment S using the selected ACS addition group. According to the invention, during the first execution of the inner loop for the current segment, the proper value of the branch metric m to use in evaluating the selected ACS addition group is the first metric value in the appropriate base set. Preferably, this value is selected by a pointer (step 134) which was initialized to the base address of set one or two when the inner loop was entered. (Step 130). In an alternate embodiment, the retreived branch metric value is calibrated according to the polarity instead of using the polarity to select a one of the ACS addition groups. (Not shown).

The ACS Add operations in the selected group are then evaluated using the retrieved value of m. (Step 136). The remaining compare and select functions of the ACS operation are then executed using conventional techniques and the traceback bit is determined and stored. (Step 140). The base set pointer is then incremented (step 140) and the inner loop repeats, using each entry in the appropriate base set in turn (step 142). Those skilled in the art will recognize that the pointer value can be updated at any time after metric m is extracted from the base set.

After the inner loop has evaluated all L ACS states for the particular segment, the program determines if all the segments have been processed (step 144). If not, the next segment S is selected (step 146) and the outer loop is repeated (starting at step 122). Once the ACS sequence for all segments has been executed, the stored traceback data can be used to extract the decoded data according to various techniques well known to those skilled in the art.

Those skilled in the art will recognize that the ACS method illustrated in FIG. 6b may be implemented in many different ways. In particular, the selection of the proper base set and of the ACS addition group according to the ACS associations may be implemented "on the fly." Alternately, the outer and inner loops can be "merged" by directly coding the proper base set and addition group associations in several discrete segment-specific "inner" loops. In the preferred embodiment, the proper ACS associations are determined in advance and expressly coded in $2^K/2L$ discrete inner loops, one for each of the $2^K/2L$ segments. FIG. 7 is a listing of pseudo code for the Viterbi algorithm of the preferred embodiment. This algorithm incorporates the base set sequences and ACS associations as defined in FIGS. 5a,b, and c. The directly coded ACS associations are indicated in bold text.

Those skilled in the art will recognize that the exact sequence of operations and method of coding may be varied without departing from the spirit and scope of the invention. Further, although the method of efficient branch metric computation for a Viterbi convolutional decoder of the present invention is discussed with reference to a IS-95 Rate 1/2, constraint length 9 convolutional encoder, the method is equally applicable to other 1/2 convolutional encoders. Those skilled in the art will also recognize that this invention can be applied to generic convolutional encoders of rate 1/N by defining the $2^{N-1}$ unique kernel metrics appropriately and adjusting the base set definitions and ACS associations as necessary. The method of the present invention can be also be applied to a generic M/N convolutional encoder by treating the encoder as M 1/N encoders operating in parallel.

We claim:

1. A method of initializing a Viterbi processor for decoding a convolutionally encoded data signal comprising the steps of:

processing an input signal comprising said encoded data symbol originating from a convolutional encoder of constraint length K to determine a kernel of unique branch metric values from a complete set of branch metric values for said convolutional encoder and said input signal; and storing a sequence of branch metric values related to said kernel branch metric values and corresponding to a set of L ordered branch metric values for said convolutional encoder in at least one base set of length L, where L is a power of 2 between 1 and $2^K$;

each state of said encoder being associated with one of said at least one base set and one of a plurality of ACS addition groups of different polarities, each group comprising a plurality of Viterbi path metric operations, where said association is based on the presence of delay operators in said convolutional encoder acting on a plurality of digit positions of said data signal prior to encoding and the effect of said delay operators on convolutionally encoded data output from said convolutional encoder at sequential encoder output stages; wherein a Viterbi add-compare-select sequence for said input signal and a particular state of said encoder comprises the steps of retrieving a branch metric value from said base set associated with said particular state and performing the path metric operations in said ACS addition group associated with said particular state using said retrieved branch metric value.

2. The method of claim 1, wherein L is greater than 1 and the step of storing a sequence of branch metric values comprises the steps of storing a first sequence of metric values corresponding to the first L metric values in said complete set of branch metric values in a first base set and storing a second sequence of metric values corresponding to a branch metric compliment of said first sequence in a second base set.

3. The method of claim 2, wherein:

said convolutional encoder is an IS-95 rate 1/2 encoder having a constraint length K of 9;

said base set length L is 16;

said first sequence of branch metric values corresponds to $M_0, M_1, M_0, M_1, M_1, M_0, M_1, M_0, -M_1, -M_0, -M_1, -M_0, -M_0, -M_1, -M_0, -M_1$;

and said second sequence of branch metric values corresponds to $M_1, M_0, M_1, M_0, M_0, M_1, M_0, M_1, -M_0, -M_1, -M_0, -M_1, -M_1, -M_0, -M_1, -M_0$;

where $M_0$ and $M_1$ are said kernel branch metric values.

4. The method of claim 3, wherein:

said plurality of ACS addition groups comprise a positive polarity ACS addition group comprising the path metric operations PSx+m and PSy−m and a negative polarity ACS addition group comprising the path metric operations PSx−m and PSy−m, where PSx and PSy are encoder state transitions from a present state x and a present state y to a common next encoder state and m is a branch metric value associated with said transitions; and said associations between each of said encoder states and said base sets and ACS addition groups are:

| Segment | Base Set | ACS addition group polarity |
| --- | --- | --- |
| 1 | 1 | positive |
| 2 | 1 | negative |
| 3 | 1 | negative |
| 4 | 1 | positive |
| 5 | 2 | positive |
| 6 | 2 | negative |
| 7 | 2 | negative |
| 8 | 2 | positive |
| 9 | 1 | negative |
| 10 | 1 | positive |
| 11 | 1 | positive |
| 12 | 1 | negative |
| 13 | 2 | negative |
| 14 | 2 | positive |
| 15 | 2 | positive |
| 16 | 2 | negative | wherein each segment S represents the L ordered encoder states beginning at state (S−1)*L.

5. A method of decoding a convolutionally encoded data signal with a Viterbi convolutional decoder comprising the steps of:

processing an input signal comprising said encoded data symbol originating from a convolutional encoder of constraint length K to determine a kernel of unique branch metric values from a complete set of branch metric values for said convolutional encoder and said input signal;

storing a sequence of branch metric values related to said kernel branch metric values and corresponding to a set of L ordered branch metric values for said convolutional encoder in at least one base set of length L, where L is a power of 2 between 1 and $2^K$;

executing in said decoder a Viterbi add-compare-select process for said input signal and a plurality of possible encoder states to generate and store traceback data; and processing said traceback data to produce decoded data;

said add-compare-select process comprising the steps of:
  a. selecting one base set for a particular one of said plurality of possible encoder states from said at least one base set according to a predefined association between each said possible encoder state and said at least one base set based on the presence of delay operators in said convolutional encoder acting on a plurality of digit positions of said data signal prior to encoding and the effect of said delay operations on convolutionally encoded data output from said convolutional encoder at sequential encoder output stages;
  b. selecting an ACS addition group for said particular one of said plurality of possible encoder states from a plurality of ACS addition groups of different polarities according to a predefined association between each said possible encoder state and said plurality of ACS addition groups based on the presence said delay operators in said convolutional encoder acting on said plurality of digit positions of said data signal prior to encoding and the effect of said delay operations on said convolutionally encoded data output from said convolutional encoder at sequential encoder output stages, each said ACS addition group comprising a plurality of Viterbi path metric operations;
  c. retrieving a branch metric value from said selected base set;
  d. evaluating said plurality of path metric operations in said selected ACS addition group using said retrieved branch metric value;
  e. selecting as a survivor path one of the minimum or maximum value of said evaluated path metric operations; and
  f. storing traceback data indicating said selected survivor path.

6. The method of claim 5, wherein L is greater than 1 and the step of storing a sequence of branch metric values comprises the steps of storing a first sequence of metric values corresponding to the first L metric values in said complete set of branch metric values in a first base set and storing a second sequence of metric values corresponding to a branch metric compliment of said first sequence in a second base set.

7. The method of claim 6, wherein:

said convolutional encoder is an IS-95 rate 1/2 encoder having a constraint length K of 9;

said base set length L is 16;

said first sequence of branch metric values corresponds to $M_0$, $M_1$, $M_0$, $M_1$, $M_1$, $M_0$, $M_1$, $M_0$, $-M_1$, $-M_0$, $-M_1$, $-M_0$, $-M_0$, $-M_1$, $-M_0$, $-M_1$;

and said second sequence of branch metric values corresponds to $M_1$, $M_0$, $M_1$, $M_0$, $M_0$, $M_1$, $M_0$, $M_1$, $-M_0$, $-M_1$, $-M_0$, $-M_1$, $-M_1$, $-M_0$, $-M_1$, $-M_0$;

where $M_0$ and $M_1$ are said kernel branch metric values.

8. The method of claim 7, wherein:

said plurality of ACS addition groups comprise a positive polarity ACS addition group comprises the path metric operations PSx+m and PSy−m and a negative polarity ACS addition group comprises the path metric operations PSx−m and PSy−m, where PSx and PSy are encoder state transitions from a present state x and a present state y to a common next encoder state and m is a branch metric value associated with said transitions; and said associations between each of said encoder states and said base sets and ACS addition groups are:

| Segment | Base Set | ACS addition group polarity |
|---------|----------|-----------------------------|
| 1 | 1 | positive |
| 2 | 1 | negative |
| 3 | 1 | negative |
| 4 | 1 | positive |
| 5 | 2 | positive |
| 6 | 2 | negative |
| 7 | 2 | negative |
| 8 | 2 | positive |
| 9 | 1 | negative |
| 10 | 1 | positive |
| 11 | 1 | positive |
| 12 | 1 | negative |
| 13 | 2 | negative |
| 14 | 2 | positive |
| 15 | 2 | positive |
| 16 | 2 | negative | wherein each segment S represents the L ordered encoder states beginning at state (S−1)*L.

9. A method of decoding a convolutionally encoded data signal with a Viterbi convolutional decoder comprising the steps of:

processing an input signal comprising said encoded data symbol originating from a convolutional encoder of constraint length K to determine a kernel of unique branch metric values from a complete set of branch metric values for said convolutional encoder and said input signal;

storing a sequence of branch metric values related to said kernel branch metric values and corresponding to a set of L ordered branch metric values for said convolutional encoder in at least one base set of length L, where L is a power of 2 between 1 and $2^K$;

executing in said decoder a Viterbi add-compare-select process for said input signal and a plurality of possible encoder states to generate and store traceback data; and processing said traceback data to produce decoded data;

said add-compare-select process comprising the steps of:
  a. selecting one base set for a particular one of said plurality of possible encoder states from said at least one base set according to a predefined association between each said possible encoder state and said at least one base set based on the presence of delay operators in said convolutional encoder acting on a plurality of digit positions of said data signal prior to encoding and the effect of said delay operations on convolutionally encoded data output from said convolutional encoder at sequential encoder output stages;
  b. retrieving a branch metric value from said selected base set;
  c. calibrating the sign of said retrieved branch metric value according to a polarity definition associated with said particular one of said plurality of possible encoder states based on the presence said delay operators in said convolutional encoder acting on said plurality of digit positions of said data signal prior to encoding and the effect of said delay operations on said convolutionally encoded data output from said convolutional encoder at sequential encoder output stages;

d. evaluating said plurality of path metric operations in said selected ACS addition group using said calibrated branch metric value;

e. selecting as a survivor path one of the minimum or maximum value of said evaluated path metric operations; and f. storing traceback data indicating said selected survivor path.

10. The method of claim 9, wherein L is greater than 1 and the step of storing a sequence of branch metric values comprises the steps of storing a first sequence of metric values corresponding to the first L metric values in said complete set of branch metric values in a first base set and storing a second sequence of metric values corresponding to a branch metric compliment of said first sequence in a second base set.

11. The method of claim 10, wherein:

said convolutional encoder is an IS-95 rate 1/2 encoder having a constraint length K of 9;

said base set length L is 16;

said first sequence of branch metric values corresponds to $M_0, M_1, M_0, M_1, M_1, M_0, M_1, M_0, -M_1, -M_0, -M_1, -M_0, -M_0, -M_1, -M_0, -M_1$;

and said second sequence of branch metric values corresponds to $M_1, M_0, M_1, M_0, M_0, M_1, M_0, M_1, -M_0, -M_1, -M_0, -M_1, -M_1, -M_0, -M_1, -M_0$;

where $M_0$ and $M_1$ are said kernel branch metric values.

12. The method of claim 11, wherein said associations between each of said encoder states and said calibration polarity are:

| Segment | Base Set | Calibration Polarity |
|---------|----------|----------------------|
| 1 | 1 | positive |
| 2 | 1 | negative |
| 3 | 1 | negative |
| 4 | 1 | positive |
| 5 | 2 | positive |
| 6 | 2 | negative |
| 7 | 2 | negative |
| 8 | 2 | positive |
| 9 | 1 | negative |
| 10 | 1 | positive |
| 11 | 1 | positive |
| 12 | 1 | negative |
| 13 | 2 | negative |
| 14 | 2 | positive |
| 15 | 2 | positive |
| 16 | 2 | negative | wherein each segment S represents the L ordered encoder states beginning at state $(S-1)*L$.

* * * * *